Feb. 11, 1969  J. S. ABATIELL, JR  3,426,913

STRUCTURAL SYSTEM AND COMPONENTS

Filed June 27, 1966  Sheet 1 of 5

INVENTOR
JAMES S. ABATIELL, JR.
BY Morse, Altman & Oates
ATTORNEYS

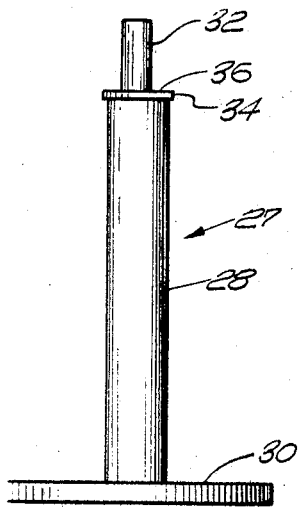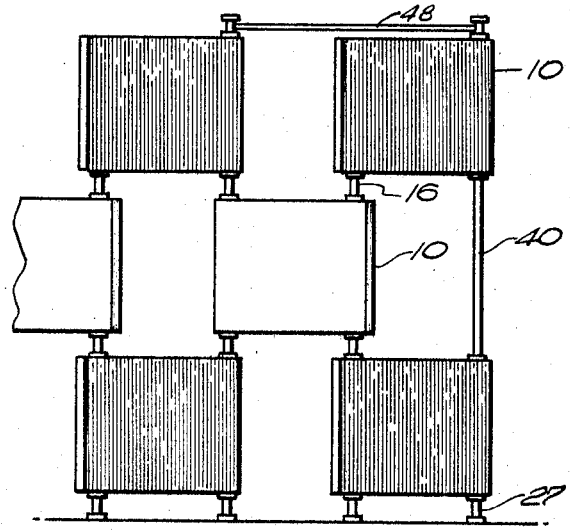
FIG. 6   FIG. 7
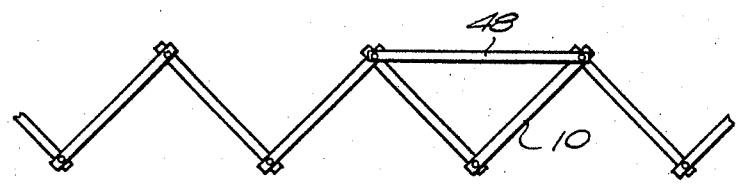
FIG. 8
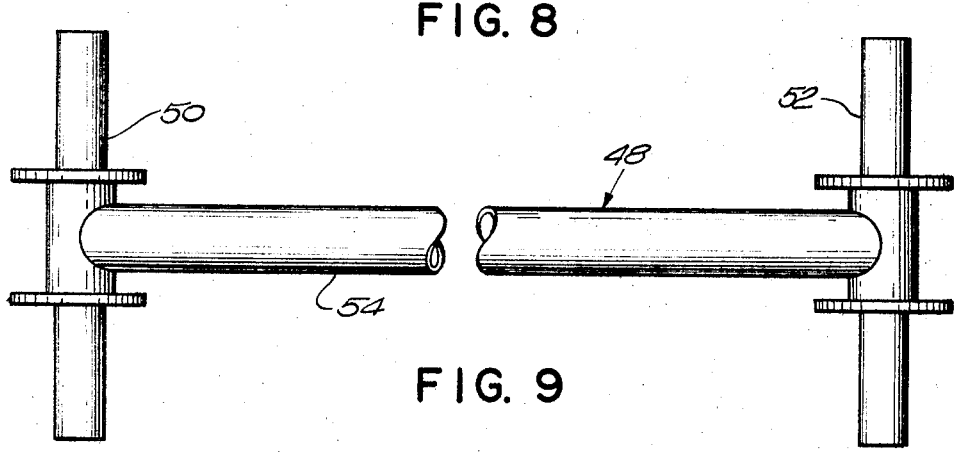
FIG. 9
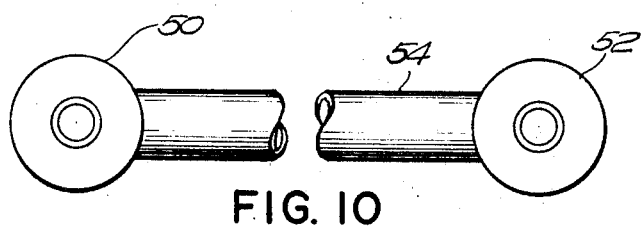
FIG. 10
INVENTOR
JAMES S. ABATIELL, JR.
BY
Morse, Altman + Oates
ATTORNEYS Feb. 11, 1969    J. S. ABATIELL, JR    3,426,913
STRUCTURAL SYSTEM AND COMPONENTS
Filed June 27, 1966    Sheet 3 of 5

INVENTOR
JAMES S. ABATIELL, JR.
BY
Morse, Altman + Oates
ATTORNEYS

Feb. 11, 1969         J. S. ABATIELL, JR         3,426,913
STRUCTURAL SYSTEM AND COMPONENTS
Filed June 27, 1966                         Sheet 4 of 5
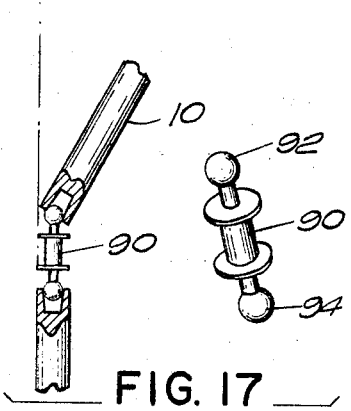
FIG. 17
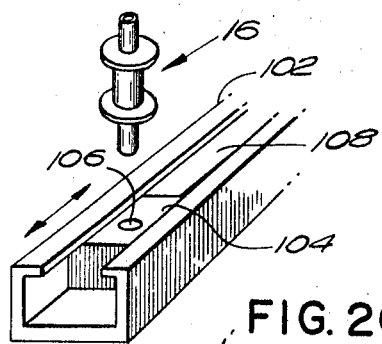
FIG. 20
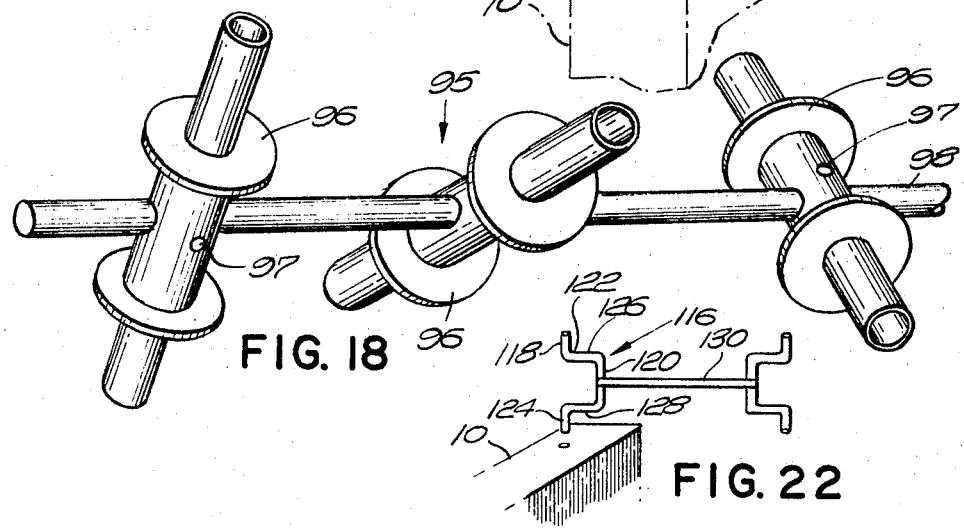
FIG. 18
FIG. 22
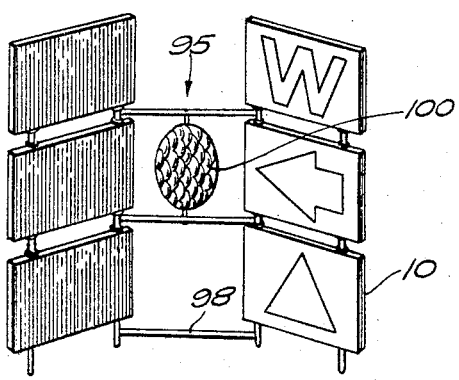
FIG. 19
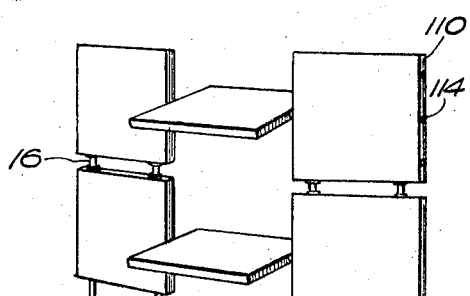
FIG. 21
INVENTOR.
JAMES S. ABATIELL, JR.
BY Morse, Altman + Oates
ATTORNEYS

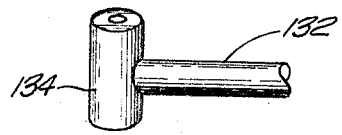
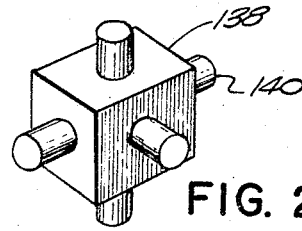
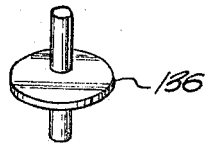
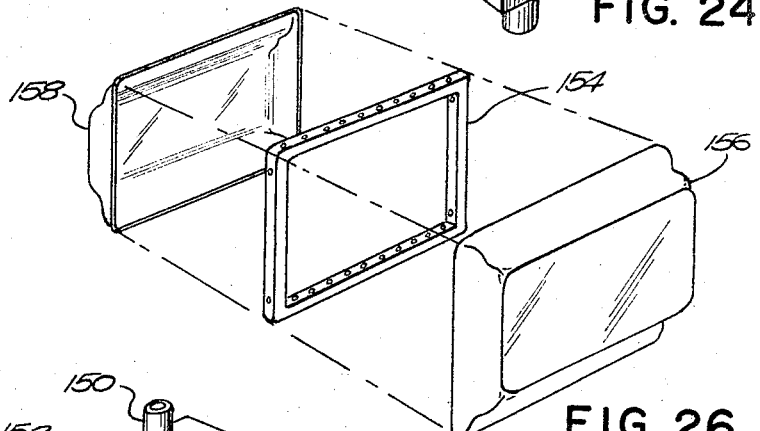
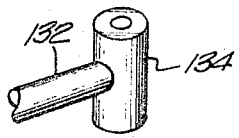
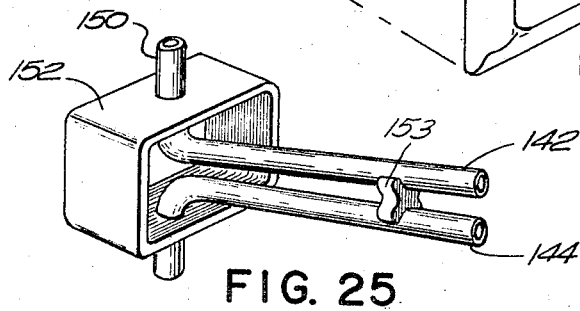
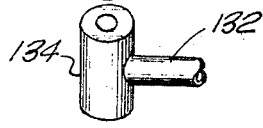
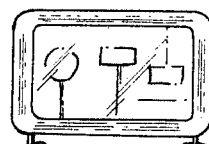
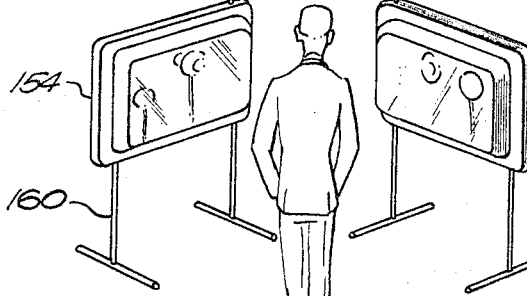

United States Patent Office 3,426,913
Patented Feb. 11, 1969

3,426,913
STRUCTURAL SYSTEM AND COMPONENTS
James S. Abatiell, Jr., 73 Phillips St.,
Rutland, Vt. 05701
Filed June 27, 1966, Ser. No. 560,704
U.S. Cl. 211—177  8 Claims
Int. Cl. A47f 5/10; G09f 7/20

ABSTRACT OF THE DISCLOSURE

Modular components comprised of panels with blind sockets and interlocking spacing elements which connect with the sockets are provided to permit the assembly of free standing structures in a variety of arrangements particularly useful for display purposes.

---

This invention relates generally to structural systems and their components and more particularly is directed towards a novel structural system employing modular components adapted to be assembled and interlocked in a variety of preselected arrangements and configurations.

There are a number of different fields which utilize structures such as free standing walls and the like. For example, full and partial free standing walls are employed frequently by architects as room dividers for use in the home or office; in art galleries for displaying paintings and the like; and in trade shows or other exhibits for forming pavilions. While such free standing walls are extremely useful for their designed purpose, they are usually custom made for a particular installation and once completed cannot be conveniently altered. Furthermore, such free standing walls for temporary use in trade shows and similar exhibits are relatively expensive in view of the fact that they are designed and fabricated for a particular function and usually cannot be dismantled and later reassembled for a different exhibit or function at a later date.

Accordingly, it is an object of the present invention to provide a structural system for use in making free standing walls and the like which may be readily assembled into any one of a variety of different arrangements and dismantled for storage and later use in the same or different arrangement.

Another object of this invention is to provide improvements in interlocking components adapted to be assembled in a variety of selected configurations for permanent or temporary installations.

More particularly, this invention features a structural system comprising a plurality of modular components adapted to be interlocked in spaced edge to edge relation and in a variety of angular positions relative to one another. This invention also features structural components for use in assembling free standing walls and the like, comprising modular members typically of rectangular outline in front elevation and, in the preferred mode, formed with sockets in the top and bottom edges thereof adjacent the corners for locking engagement with spacer elements. In this fashion the modular components may be assembled in a variety of different configurations according to particular applications and may be readily dismantled for storage or for reassembly in a different configuration.

Figure 1:
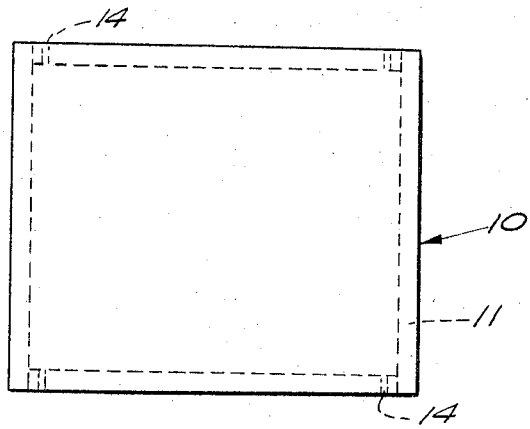
Figure 2:
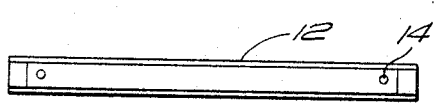
Figure 3:
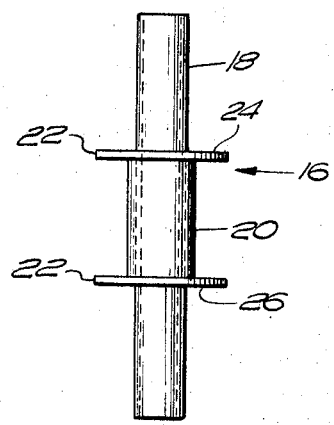
Figure 4:
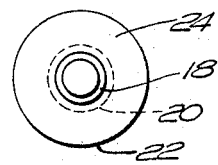
Figure 5:
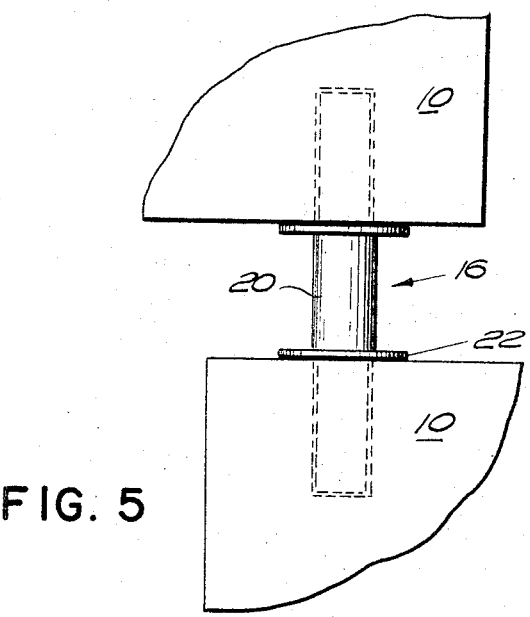
Figure 11:
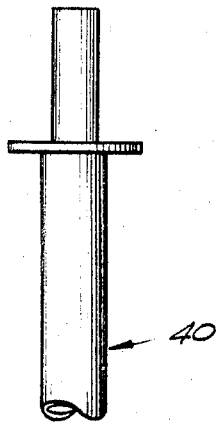
Figure 12:
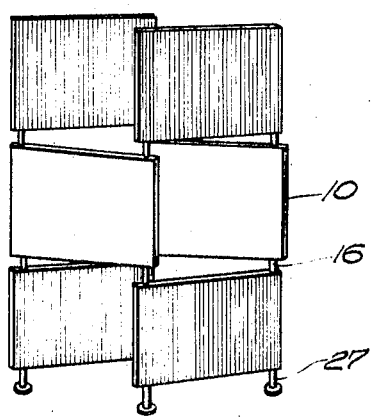
Figure 13:
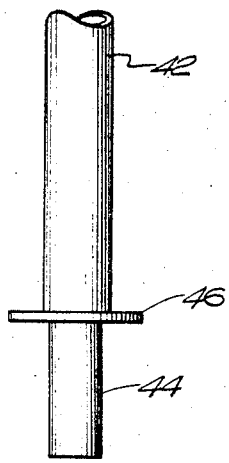
Figure 13:
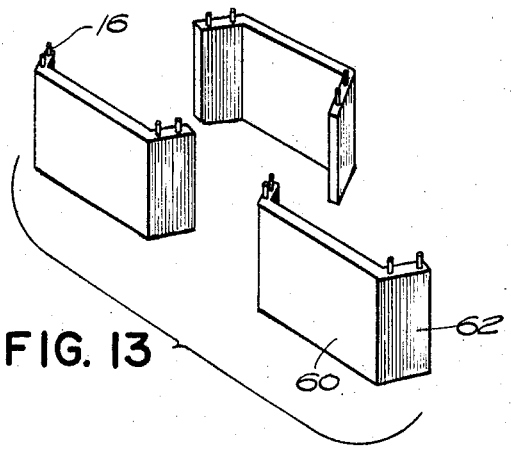

However, these and other features of the invention, along with further objects and advantages thereof, will become more apparent from the following detailed description of preferred embodiments of the invention, with reference being made to the accompanying drawings, in which:

FIG. 1 is a view in front elevation of a modular panel component for use in the structural system and made according to the invention, FIG. 2 is a top plan view thereof, FIG. 3 is a view in front elevation of a spacer lock made according to the invention, FIG. 4 is an end view thereof, FIG. 5 is a fragmentary front elevation, partly in section, showing portions of a pair of panels in interlocked assembled relation with a spacer lock, FIG. 6 is a view in front elevation, partly in section, of an interlocking foot member made according to the invention, FIG. 7 is a view in front elevation of a typical free standing wall assembled from the components of FIGS. 1 through 6, FIG. 8 is a top plan view thereof, FIGS. 9 and 10 are front elevation and top plan views respectively of a modified spacer lock made according to the invention, FIG. 11 is a front elevation of a vertical brace which may be employed in the system, FIG. 12 is a view in perspective showing another assembly arrangement using the same basic components, FIG. 13 is a view in perspective showing a modification of the invention, FIGS. 14–18 are views in perspective showing modified spacer lock devices, FIG. 19 is a view in elevation showing an assembly embodying the FIG. 18 device, FIG. 20 is a view in perspective showing a further modification of the invention, FIG. 21 is a view in perspective showing another assembly configuration, FIG. 22 is a view in perspective showing a further modified form of the connecting device, FIG. 23 is a view in perspective of still another modification of the invention, FIG. 24 is a view in perspective of a modified form of the connecting device, FIG. 25 is a view in perspective of a connecting device and bracket for use with the system, and FIGS. 26 and 27 are views in perspective of novel display panels for use with the system.

Referring now to the drawings and particularly to FIGS. 1 and 2, there is shown a modular panel 10 which, in this embodiment, comprises a square frame 11 of wood or the like typically 30" square with the front and rear sides thereof covered by a suitable facing 12 such as a decorative wooden veneer, for example. The resulting panel of the illustrated embodiment is on the order of 1½" in thickness and the surrounding frame 11 is formed with sockets 14 in the top and bottom edges thereof adjacent the corners. While the illustrated panel 10 has been described as being fabricated from wood, obviously a number of other different building materials may be utilized to advantage.

The panel sockets 14 are adapted to receive a spacer lock 16 shown in FIGS. 3 and 4. This spacer lock comprises a tubular core 18, typically of ⅜" cold rolled steel tubing three inches in length and carrying a bushing 20 in the mid-portion thereof. The bushing 20 typically is ½" steel tubing 1" in length with 1" diameter washers 22 brazed to the ends thereof to form annular shoulders 24 and 26 equidistant from the opposite ends of the spacer assembly. In practice, the spacer may be chromed for a decorative appearance, to protect it from corrosion and abrasion and also to provide a smooth surface for ease of insertion in the panel socket.

Referring now more particularly to FIG. 5 there is shown the spacer lock 16 of FIGS. 3 and 4 joined between a pair of vertically adjacent panels 10 in interlocked spaced relation. The reduced ends of the spacer lock 16 are inserted in cooperating sockets 14 of the two panels whereby the edges of the two panels seat against the annular shoulders 24 and 26 of the lock. In this fashion the two panels are held in spaced relation one to another although either panel may be rotated about the vertical axis extending through the axis of the lock whereby an assembly of the panels and locks may be arrayed over a floor in a circular or angular pattern, for example, according to particular requirements. FIGS. 7 and 8 by way of illustration show a typical assembly of three horizontal rows of panels 10 which are interconnected in staggered relation, one panel being supported by two panels and itself in turn supporting two other panels so that there is a large space between adjacent panels. In order to provide stability for the assembly, vertical rows of panels are angularly oriented about vertical axes in staircase fashion as best shown in FIG. 8. Obviously, the panels could be arranged into a curved or boxed floor pattern to obtain the desired stability.

In FIG. 6 there is shown a foot element 27 for supporting the panels in a raised position. The foot element comprises an elongated tubular piece 28, typically 6 inches or so in length, centrally mounted to a circular plate 30, typically 4" in diameter, at the lower end thereof and carrying a telescoped tubular piece 32 of reduced size with exposed portion of about 1" in length. The smaller tube 32 is brazed or otherwise secured to the larger tube 28 coaxially therewith and carries a collar 34 which forms an annular shoulder 36 adapted to support panels mounted thereon. It will be understood that the reduced portion of the foot is inserted in a socket in the lower edge of the panel to be supported.

In order to provide support for end panels and/or to eliminate one or more panels otherwise needed in an assembled array, an extension brace 40 (FIG. 11) is provided. As shown in FIG. 7 the brace 40 may be interposed between upper and lower end panels in order to provide support for overhanging upper panels. The brace 40 may be made up in any length and in the FIG. 7 mode the length corresponds with the combined width of the panel plus the lengths of two locking devices in place, whereby the panel supported by the brace will be parallel with other panels in its row. The brace typically comprises a tubular center section 42 at each end of which is a reduced tubular piece 44 mounted therein and carrying an annular collar 46.

For the purpose of stabilizing an assembly of staggered panels a horizontal spacer 48 (FIGS. 9 and 10) is provided. This spacer comprises a pair of spacer locks 50 and 52 similar in construction to the basic spacer lock 16 but mounted to either end of an elongated member 54 extending at right angles between the two lock members. Typically the length of the spacer is on the order of 42" or so and may be employed to span between alternate joints of vertical rows of panels as best shown in FIGS. 7 and 8. It will be understood that the lock ends of the spacer are received in sockets of the panels and in this fashion the angular relation of the panels becomes fixed.

In FIG. 12 there is shown another arrangement employing the same basic components and in this arrangement the panels 10 are joined to form a four-sided kiosk with the panels interlocked in a boxed staggered relation. A great variety of configurations may be worked out using these basic components. For example, three-sided kiosks, free standing straight or curved walls of selected heights, pyramidical shaped displays or any one of a variety of other arrangements may be fabricated.

In FIG. 13 is shown a modification of the invention and in this embodiment panels 60 are formed with offset portions 62 at either end thereof and provided with one or more sockets along their upper and lower edges for reception of the locking devices 16 whereby the panels may be interlocked in a fashion similar to those of the principal embodiment. It will be understood that the offset portions provide inherent stability for the assembly so that a free standing wall may be constructed without angularly staggering the panels. Furthermore, the configuration provides an interesting pattern when used in a wall and is well suited for the display of paintings, advertising materials and the like. Preferably, the side portions 62 are offset each at about a 45° angle from the planar center portion of the panel 60 whereby the panels may be easily nested for compact shipment and storage.

Figure 14:
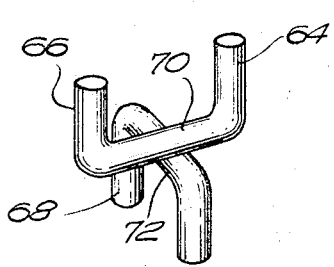

FIG. 14 shows a modified spacer lock 64 comprising a pair of U-shaped members 66 and 68 connected by their center portions 70 and 72 at right angles to one another. This particular device is useful in assembling panels which are to be angularly staggered in the fashion of FIG. 8 and it will be understood that the vertical legs of the locks may engage mating sockets formed in the panel edges or alternatively the panel may be set edgewise in the U-shaped portions of the lock between the vertical legs. The two U-shaped portions may be fixed to one another, as shown, or they may be in two pieces and joined by a suitable connector such as a bolt to permit angular adjustment of the two parts.

Figure 15:
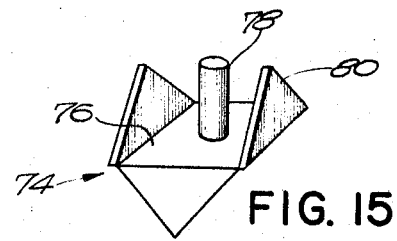

In FIG. 15 there is shown a further modification of the invention and in this embodiment a spacer lock 74 is provided with a rectangular plate 76 through which may pass a cylindrical post 78 extending equally above and below the plate for insertion in the panel sockets. Extending upwardly from one pair of opposite sides and depending from the other pair of opposite sides of the plate are lips 80 which engage the margins of the panels thereby establishing the angular relation of interlocked panels.

Figure 16:
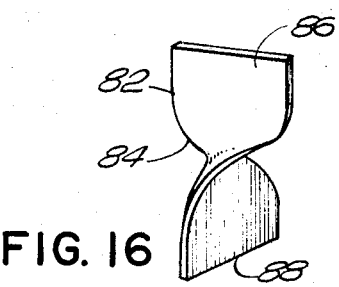

In FIG. 16 there is shown another lock 82 which comprises a one-piece member of a flat strip material the ends of which have been twisted with respect to one another thereby forming shoulders 84 to support the panels and offset ends 86 and 88 for insertion in mating sockets formed in the panels.

In FIG. 17 there is shown a spacer lock 90 similar to that shown in FIGS. 3 and 4 but in this instance provided with balled ends 92 and 94 which permit a limited amount of tilting of panels. Such capability is useful for inclining an upper row of panels for example, for optimum presentation of material displayed thereon.

In FIG. 18 there is shown an adjustable bracket 95 comprising a series of spacer locks 96 each with a set screw 97 and similar to the principal embodiment but mounted along a spacer bar 98 extending through the centers of the locks at 90° angles to the axes thereof. The individual spacer locks are rotatably and slidably mounted to the rod 98 to permit angular adjustment as well as lateral positioning of panels supported thereon. For example, in FIG. 19 there is shown a series of panels 10 mounted one above another with vertical rows maintained in horizontally spaced relation by spacer bars 48 at the top and bottom edges. In the mid-portions of the assembly are brackets 95 extending between the two vertical rows of panels with the outermost spacer locks serving to interlock the panels and the center locks providing support for a device such as the oval panel 100.

In FIG. 20 there is shown a further modification of the invention and, in this embodiment, a panel 10' has mounted along the edges thereof a channel member 102 providing a semi-closed track for a slide block 104 mounted therein. The block 104 should be fabricated from a resilient material such as a semi-hard rubber or plastic and dimensioned to fit snugly but not tightly in the track. The block is formed with a center opening 106 in register with a longitudinal channel slot 108. The dimensions of the socket 106 are slightly smaller than the reduced end of a spacer lock 16. However, the resilient character of the block permits the end of the lock to be pushed into the socket, the resilient material yielding under the force applied against the lock. The block itself, without the spacer locker inserted, may be pushed along the track to a selected position. However, once the lock is inserted, the block becomes somewhat deformed and expanded such as to be wedged tightly in position. In this fashion a very rigid assembly of components may be put together without danger of the configuration becoming displaced accidentally.

In FIG. 21, there is shown yet another modification of the invention and, in this embodiment, panels 110 are provided with sockets 114 in their side edges as well as their upper and lower edges as in the principal embodiment. These sockets may be the simple drilled sockets of FIG. 1 or they may take the form of the adjustable sliding block assembly described in connection with FIG. 20. In any event, the arrangement permits the panels to be interconnected horizontally as well as vertically by the spacer locks 16. When horizontally adjacent panels are connected together, it may be by pairs of spacer locks or by single spacer locks permitting panels to be tilted to various angular positions about horizontal axes as suggested in FIG. 21.

Finally, in FIG. 22, there is shown still another modified form of spacer lock 116. As shown, the spacer lock comprises a one-piece element 118 which may be a cylindrical tube or solid member formed with a center section 120 and a pair of offset upper and lower legs 122 and 124. The offset legs form a pair of shoulders 126 and 128 which serve the same function as the annular shoulders of the spacer lock 16 of the principal embodiment. It will be understood that the offset legs are adapted to be inserted in sockets formed in the edges of the panels and serve to join the panels as well as to maintain them in spaced relation in the same fashion as the spacer lock 16. As shown in FIG. 22, the locks may be joined in pairs by means of a spacer bar 130 for applications similar to the spacer strut 48 shown in FIGS. 9 and 10.

In FIG. 23 there is shown a group of accessory components which may be utilized in the system to achieve certain special configurations such as a common vertical support for an array of panels and/or horizontal braces. The group includes a plurality of horizontal supports 132 having female socket connectors 134 mounted perpendicularly at the ends for mating engagement with male spacer locks 136. An extension brace 40, previously illustrated in FIG. 11 is shown between two of the supports 132.

In FIG. 24 there is illustrated a modified spacer lock comprising a cubical body 138 having a post 140 extending from each face. With this construction a single lock can serve as a common joint for up to six panels or other components.

In FIG. 25 there is shown a modified form of the horizontal spacer 48 of FIGS. 9 and 10. This embodiment comprises a pair of rods 142 and 144 each with right angularly bent end portions 150 adapted to extend through aligned openings in a rectangular open ended box 152. An X or H shaped grommet 153 is inserted between the rods to maintain them in spaced parallel relation and to locate the bent end portions with respect to the box.

FIGS. 26 and 27 show a variation of the modular panels and comprise a frame 154 to which are mounted by hinges or the like front and rear transparent bubble panels 156 and 158. The assembly may be utilized as a showcase to display products and may be free standing on legs 160 singly or in assembled groups, interlocked one with another.

It will be appreciated that the system and components described above are extremely useful and provide a great deal of flexibility for the designer, the architect, the builder and others active in these and other related fields. The panels and locking devices may be utilized to fabricate a wide variety of structures ranging from simple displays involving a few panels for advertising and the like to entire walls employing a great many panels useful as room dividers, office partitions, and the like. The system is particularly advantageous for use in short-lived exhibits and the like in which the display stands are erected on a temporary basis. For such uses the components may be readily assembled into any one of a variety of different configurations best suited for a particular area and surroundings and laid out in any one of a variety of different floor patterns whereby aisles and booths, for example, may be defined over a wide, open floor. Not only may the components be readily assembled and dismantled, they are reuseable for different exhibits thereby eliminating the usual costs associated with fabricating custom made exhibit stands, for example. Also, the components when dismantled occupy a minimum amount of space and are easily stored to fit in a very small volume. By the same token, the components may be readily shipped from point to point since they are small, light in weight and may be easily shipped in cartons of very compact size.

While the invention has been described with particular reference to the illustrated embodiments, numerous modifications thereto will appear to those skilled in the art. For example, the panels may be of a variety of configurations and sizes and in some instances may be fabricated as boxes, drums or the like with suitable sockets formed to receive the locking devices. Such boxes or drums may be provided with transparent walls for the display of merchandise. Also, the components may be permanently assembled by the use of cement or the like applied to the spacer locks. In this regard, the spacer locks or the sockets may be provided with small frangible bags of adhesives, such as an epoxy resin, whereby insertion of a spacer lock in a cooperating socket will cause the bag to burst and release its contents. In this fashion, the spacer locks and panels will become permanently bonded to one another. Also the panels may be provided with sockets along their margins at right angles to the edge sockets to permit fabrication of booths and tables, for example, wherein a panel may be mounted in a horizontal plane on the top of two spaced parallel and facing vertical panels. Desks and similar structures may also be fabricated in this fashion. The spacer locks may assume a variety of configurations as will readily appear to those skilled in the art.

Accordingly, the above description and accompanying drawings should be taken as illustrative of the invention and not in a limiting sense.

Having thus described the invention, what I claim and desire to obtain by Letters Patent of the United States is:

1. A structural system, comprising
   (a) a plurality of modular members having parallel top and bottom faces,
   (b) said members being formed with sockets in said faces, and
   (c) a plurality of locking devices for joining said members in assembed relation,
   (d) each of said locking devices being formed with end portions dimensioned to be inserted in said sockets and a pair of spaced shoulders between said end portions for maintaining the opposing faces of assembled members in spaced relation to one another,
   (e) a horizontal bracing device including an elongated element and a plurality of locking devices mounted in spaced relation along said element, each of said locking devices being disposed perpendicularly to said element and being formed with end portions dimensioned to be inserted in said sockets and a pair of spaced shoulders between said end portions.

2. A structural system according to claim 1 wherein said modular members comprise flat rectangular panels with said sockets being formed in the edges thereof, each panel having a planar working surface on each side thereof.

3. A structural system, comprising
   (a) a plurality of modular members in the form of rectangular panels each having planar center portions and angular offset side portions and having parallel top and bottom faces, (b) said members being formed with sockets in said faces, and (c) a plurality of locking devices for joining said members in assembled relation, (d) each of said locking devices being formed with end portions dimensioned to be inserted in said sockets and a pair of spaced shoulders between said end portions for maintaining the opposing faces of assembled members in spaced relation to one another.

4. A structural system, comprising (a) a plurality of modular members having parallel top and bottom faces, (b) said members being formed with sockets in said faces, and (c) a plurality of locking devices for joining said members in assembled relation, (d) each of said locking devices being formed with a pair of oppositely extending U-shaped pieces joined together at their centers dimensioned to be inserted in said sockets and a pair of spaced shoulders between the end portions for maintaining the opposing faces of assembled members in spaced relation to one another.

5. A structural system, comprising (a) a plurality of modular members having parallel top and bottom faces, (b) said members being formed with sockets in said faces, and (c) a plurality of locking devices for joining said members in assembled relation, (d) each of said devices comprising a rigid strip the ends of which are twisted about the longitudinal axis thereof, the twisted ends forming thereby a pair of spaced shoulders between the ends thereof for maintaining the opposing faces of assembled members in spaced relation to one another.

6. A structural system, comprising (a) a plurality of modular members having parallel top and bottom faces, (b) said members being formed with sockets in said faces, (c) a plurality of locking devices for joining said members in assembled relation, (d) each of said locking devices being formed with end portions dimensioned to be inserted in said sockets and a pair of spaced shoulders between said end portions for maintaining the opposing faces of assembled members spaced in parallel relation to one another, (e) a channel member mounted lengthwise along the edges of said modular member, said channel member being formed with a longitudinal slot and a resilient block mounted in said channel, said block being formed with a socket in register with said slot and adapted to accommodate the end portion of a locking device inserted therein, said block being thereby deformed and wedged in said channel.

7. A structural system, comprising (a) a plurality of modular members having parallel top and bottom faces, (b) said members being formed with sockets in said faces, (c) a plurality of locking devices for joining said members in assembled relation, (d) each of said locking devices being formed with end portions dimensioned to be inserted in said sockets and a pair of spaced shoulders between said end portions for maintaining the opposing faces of assembled members in spaced parallel relation to one another, (e) a horizontal bracing device including a pair of elongated rods each with their end portions bent perpendicularly to the length thereof, an open-ended box for each end of the pair, the walls of said box being formed wih openings through which extend said end portions and a resilient member mounted between said rods to hold said end portions in position.

8. A structural system, comprising (a) a plurality of modular, three-dimensional, rigid, self-supporting members having parallel top and bottom faces, (b) said members being formed with shallow blind sockets in said faces, (c) a plurality of locking devices for joining said members in assembled relation, (d) each of said locking devices being formed with end portions dimensioned to be inserted in said sockets and a pair of spaced shoulders between said end portions for maintaining the opposing faces of assembled members in spaced relation to one another, (e) a horizontal bracing device including an elongated rod and a head mounted at each end thereof, each head being formed with a pair of oppositely facing sockets, the axes of said sockets being perpendicular to the length of said rod.

References Cited

UNITED STATES PATENTS

| | | | |
|---|---|---|---|
| 1,286,241 | 12/1918 | Crowl | 211—96 |
| 1,400,066 | 12/1921 | Huck | 46—29 |
| 2,501,044 | 3/1950 | Gianelloni. | |
| 2,602,252 | 7/1952 | Shinn. | |
| 2,609,638 | 9/1952 | Lindenmeyer | 46—29 |
| 2,662,335 | 12/1953 | Calverley | 46—29 XR |
| 2,791,851 | 5/1957 | Richter. | |
| 2,915,314 | 12/1959 | Phillips. | |
| 2,917,188 | 12/1959 | Menin | 211—177 |
| 2,970,396 | 2/1961 | Worrell. | |
| 2,993,604 | 7/1961 | Sullivan | 211—177 XR |

CHANCELLOR E. HARRIS, Primary Examiner.

U.S. Cl. X.R.

40—125